(12) United States Patent
Cooke, Jr.

(10) Patent No.: US 10,261,387 B2
(45) Date of Patent: Apr. 16, 2019

(54) VISION CORRECTION SYSTEM

(71) Applicant: Duke Ellington Cooke, Jr., Redondo Beach, CA (US)

(72) Inventor: Duke Ellington Cooke, Jr., Redondo Beach, CA (US)

(73) Assignee: ISEE, LLC, Redondo Beach, CA (US)

( * ) Notice: Subject to any disclaimer, the term of this patent is extended or adjusted under 35 U.S.C. 154(b) by 0 days.

(21) Appl. No.: 15/881,683

(22) Filed: Jan. 26, 2018

(65) Prior Publication Data

US 2018/0149945 A1    May 31, 2018

Related U.S. Application Data

(63) Continuation-in-part of application No. 15/706,641, filed on Sep. 15, 2017, which is a continuation-in-part of application No. 14/611,153, filed on Jan. 30, 2015, now abandoned.

(60) Provisional application No. 61/933,784, filed on Jan. 30, 2014.

(51) Int. Cl.
| | | |
|---|---|---|
| *G02F 1/29* | (2006.01) | |
| *G02B 27/00* | (2006.01) | |
| *G02C 7/08* | (2006.01) | |

(52) U.S. Cl.
CPC .............. *G02F 1/29* (2013.01); *G02B 27/00* (2013.01); *G02B 27/0025* (2013.01); *G02B 27/0068* (2013.01); *G02C 7/081* (2013.01)

(58) Field of Classification Search
CPC ... G02F 1/29; G02B 27/0068; G02B 27/0025; G02B 27/00; G02C 7/081
USPC .......................................................... 359/573
See application file for complete search history.

(56) References Cited

U.S. PATENT DOCUMENTS

| | | | |
|---|---|---|---|
| 9,784,994 B2 * | 10/2017 | Childers ................ G02C 7/083 |
| 2007/0151631 A1 * | 7/2007 | Fernandez Camacho ................... | |
| | | | A61K 41/0052 |
| | | | 148/300 |
| 2009/0141193 A1 * | 6/2009 | Nakayama ........... H04N 9/3129 |
| | | | 348/751 |
| 2010/0225834 A1 * | 9/2010 | Li ............................ G02C 7/08 |
| | | | 349/13 |
| 2012/0300171 A1 * | 11/2012 | Gupta .................... G02C 7/085 |
| | | | 351/159.4 |
| 2015/0185503 A1 * | 7/2015 | Tate ........................ G06F 3/013 |
| | | | 351/158 |
| 2018/0007343 A1 * | 1/2018 | Send .................. H04N 13/0217 |

* cited by examiner

*Primary Examiner* — William R Alexander
(74) *Attorney, Agent, or Firm* — Tope-McKay & Associates

(57) ABSTRACT

A vision correction system which is comprised of an electronic panel display to produce, create or emit light, a configurable grid which alters the path of the light coming from the electronic panel display, a grid controller, a screen, and a viewer. The grid controller by means of either sensors or input devices determines the correct configuration for the configurable grid such that the grid alters the light emanating from an electronic panel display in such a way that it corrects for visual acuity problems possessed by the viewer.

9 Claims, 3 Drawing Sheets

VISION CORRECTION SYSTEM

PRIORITY CLAIM

The present invention is a Continuation-in-Part application claiming the benefit of priority of U.S. Non-Provisional application Ser. No. 15/706,64 filed on Sep. 15, 2017, titled, "Vision Correction System", which claims the benefit of U.S. Non-Provisional application Ser. No. 14/611,153, filed on Jan. 30, 2015, titled, "Vision Correction System", which in turn, claims the benefit of priority from U.S. Provisional Application 61/933,784, filed in the United States on Jan. 30, 2014, titled, "Stock Check and I See Software".

BACKGROUND OF THE INVENTION

(1) Field of Invention

The present invention relates to a vision correcting system.

(2) Description of Related Art

Approximately 75 percent of adults in the US use some form of vision correction. Most individuals who need vision correction rely on glasses or contact lenses. The conditions which necessitate vision correction are varied but generally fall into three categories, myopia, hyperopia, and astigmatism. At their core each of these conditions involve a failure of the eye to focus light on the retina.

Glasses and contact lenses correct vision in a similar fashion, by taking into account the way in which an eye is failing to focus light on the retina, the glasses or contact lenses alter the path the light takes prior to passing through the eye. The eye then refocuses the altered light which is thereby focused on the retina. Vision correcting surgery works in a similar fashion by directly altering the eye so that light is properly focused on the retina. Ultimately, for any vision correction system to be successful, it must address the failure of the eye to focus light on the retina.

However, glasses, and contacts have drawbacks. With respect to glasses and contacts, many users find them irritating to wear. Further, there are many situations where it is impractical or even dangerous for an individual to wear glasses or contacts. For instance, most users do not wear glasses to bed for comfort and safety reasons. If the individual needs to look at something while in bed, like their phone, they must put on their glasses or contacts to do so. Additionally, glasses and contacts can become lost or break, making it difficult for users to interact with the objects around them.

Vision correction is a necessity whenever lack of visual acuity would prevent and individual from performing a desired task. Some of the most common situations requiring visual acuity are reading, watching television, working on a computer, recreation, and driving. Many of these situations involve devices that display images or text. More particularly, they involve devices that have configurable displays, like phones, televisions, computer screens, electronic displays, dashboards, etc.

What is needed is a system to correct vision which does not require the user to always have vision correcting devices on their person and which is applicable to many common situations where visual correction is a necessity. The present invention provides an improvement over typical vision correcting systems by integrating the vision correction system into objects and devices which already contain configurable displays. This reduces the need to use glasses and contacts when performing tasks which incorporate the present invention in their displays.

SUMMARY OF INVENTION

The present invention relates to a system for correcting vision comprising a light source, a configurable grid, a grid controller, a screen and a viewer. The light travels from the light source through the configurable grid and the screen to the viewer such that when the grid controller instructs the configurable grid to change shape, the shape of the configurable grid modifies the path of the light through the screen thereby altering the path of the light to the viewer.

In another aspect of the system, the grid controller receives input from one or more sensors.

Additionally, the grid controller may instruct the configurable grid to change shape based on inputs received from the sensors.

In another aspect of the vision correction system, the system further comprises an input device.

Additionally, the grid controller may instruct the configurable grid to change shape based on inputs from the input device.

In yet another aspect of the vision correction system, one of the sensors is a camera.

In another aspect of the system, one of the sensors is a rangefinder.

In yet another aspect of the system, the grid controller changes the shape of the configurable grid based on further inputs from an input device.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
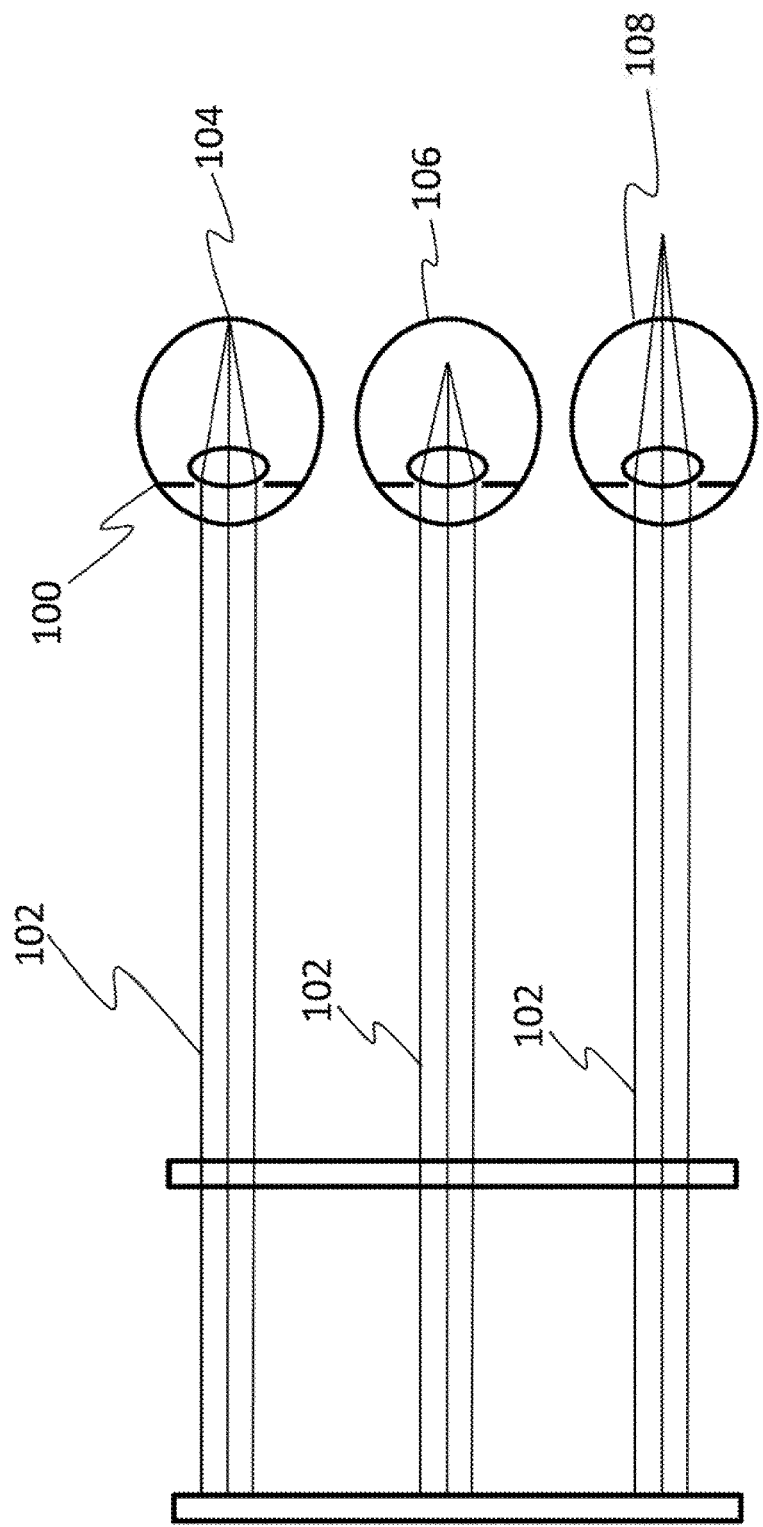
FIG. 1 is a front-view illustration of a traditional backlight and screen.

The present invention relates to a vision correcting system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, an introduction is provided to give the reader a general undemanding of the present invention. Next, a description of various aspects of the present invention is provided to give an understanding of the specific details.

(1) Introduction

The present invention relates to a vision correction system. A configurable grid alters the path light takes through a screen based on instructions from a grid controller. This grid is attached to or integrated within a screen which contains images or text the viewer wants to view. By altering the path of light as it exits the screen the grid allows the present invention to correct the vision of a user by altering the images or text in a manner that corrects for visual conditions the viewer might possess.

(2) The Vision Correction System

Electronic panel displays take many forms. Such displays are used for a wide variety of electronic devices, including such consumer electronics as televisions, computers, and handheld devices (e.g., cellular telephones, audio and video players, gaming systems, and so forth).

Liquid Crystal Displays (LCDs) are a common form of electronic panel display. LCDs typically include an LCD panel having, among other things, a plurality of picture elements (pixels) arranged in a matrix to display an image. Each pixel may include sub-pixels (e.g., red, blue, and green sub-pixels) which variably permit light to pass when an electric field is applied to a liquid crystal material in each sub-pixel. Proximate to the LCD panel is a backlight. This typically takes the form of a matrix of light emitting diodes that in concert emit light in a specific set of wavelengths. The backlight and the LCD panel are typically arranged in layers so that as light is emitted by the backlight it is filtered by the LCD panel before it is eventually emitted from the LCD and travels towards the viewer.

Other types of panel displays include Organic Light Emitting Displays (OLEDs), and Plasma displays. With respect to the present invention, and similar to LCDs, they all contain a plurality of picture elements (pixels) arranged in a matrix to display an image. However, the need for a backlight varies by technology; OLED pixels need no backlight because the light emitting diodes (LEDs) which comprise each pixel emit light of sufficient strength and wavelength. Plasma display pixels use small cells filed with gas that emit ultraviolet light which in turn pass through a layer that contains chemicals which fluoresce when struck by the ultraviolet light.

As shown in FIG. 1, the most common visual acuity problems originate from a failure of the eye 100, to correctly focus light 102 on the retina 104. Vision correction systems function by altering the path of the light 102 before it gets to the eye 100, so that when the eye 100 focuses the light 102, it will focus at the retina 104, rather than in front 106 of the retina 104 (Myopia) or behind 108 the retina 104 (Hypermetropia). Typically, visual acuity problems are corrected by attaching some type of refractive device to the viewer (e.g. glasses, contacts, etc.). However, in this case, the present invention includes a refractive device attached to the electronic panel display as additional layer in the electronic panel display. As a practical matter, this layer can be added to any type of screen and or display that utilizes an electrical current or an electrical charge to produce, create or emit light, such as LCDs, OLEDs, and plasma displays. This refractive device alters the path of the light 102 to focus it correctly on the viewer's retina 104. Thus, the system is able to correct the image emitted from the LDC panel before it gets to the user, avoiding the need for corrective lenses or glasses.

Figure 2:
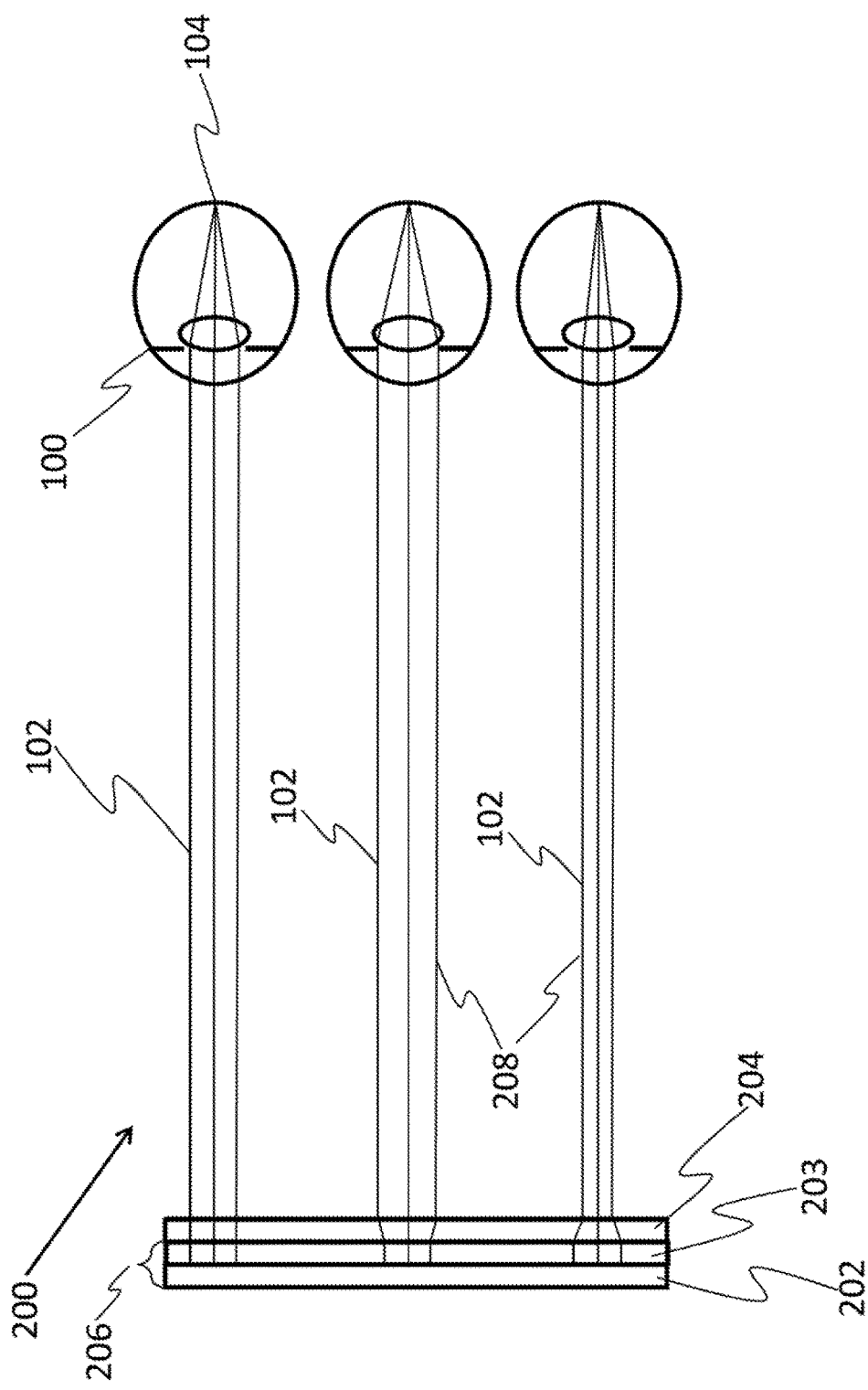
FIG. 2 is a left, side-view illustration of a vision correction system according to the present invention.

As shown in FIG. 2, the present invention is a vision correction system 200. One embodiment of the vision correction system 200 includes a backlight 202, which emits light 102, a plurality of pixel elements arranged in a matrix to form a panel 203 which in combination comprises an electronic panel display 206. In another embodiment (not depicted), the electronic panel display has no separate backlight, but instead is comprised of a plurality of pixel elements arranged in a matrix to form a panel that emits light. In either embodiment, a configurable grid 204 is attached to the electronic panel display 206. The backlight 202, if present, the panel 203 and the configurable grid 204 are arranged in a series of layers. The configurable grid 204 is comprised of magnetically sensitive nanoparticles suspended in an optically transparent medium and an array of micro-electromagnets which control the location and orientation of the magnetically sensitive nanoparticles. The optically transparent medium can take the form of any material that allows light to pass through with minimal interference and also allows the magnetically sensitive nanoparticles to change their orientation and location within the optically transparent medium. Non-limiting examples, include gels, oils, water, or MEMs based particle storage mechanisms. The configurable grid 204 alters the path 208 of the light 102 by activating some or all of the micro-electromagnets, which in turn, alter the orientation or location of the magnetically sensitive nanoparticles within the optically transparent medium thereby modifying the refractive properties of the configurable grid 204. The light 102 is thereby redirected or blocked by the magnetically sensitive nanoparticles contained in the optically transparent medium. By altering the path 208 of the light 102 before it gets to the eye 100, the eye 100 despite whatever visual acuity problems it might possess, will focus the light 102 on the retina 104 rather than in front of or behind the retina as depicted in FIG. 1 items 106 and 108. One skilled in the art should notice, such a system 200 is capable of correcting for any vision acuity problem which involves a failure to focus light on the retina, including but not limited to Myopia, Hypermetropia, and Astigmatism, etc.

Figure 3:
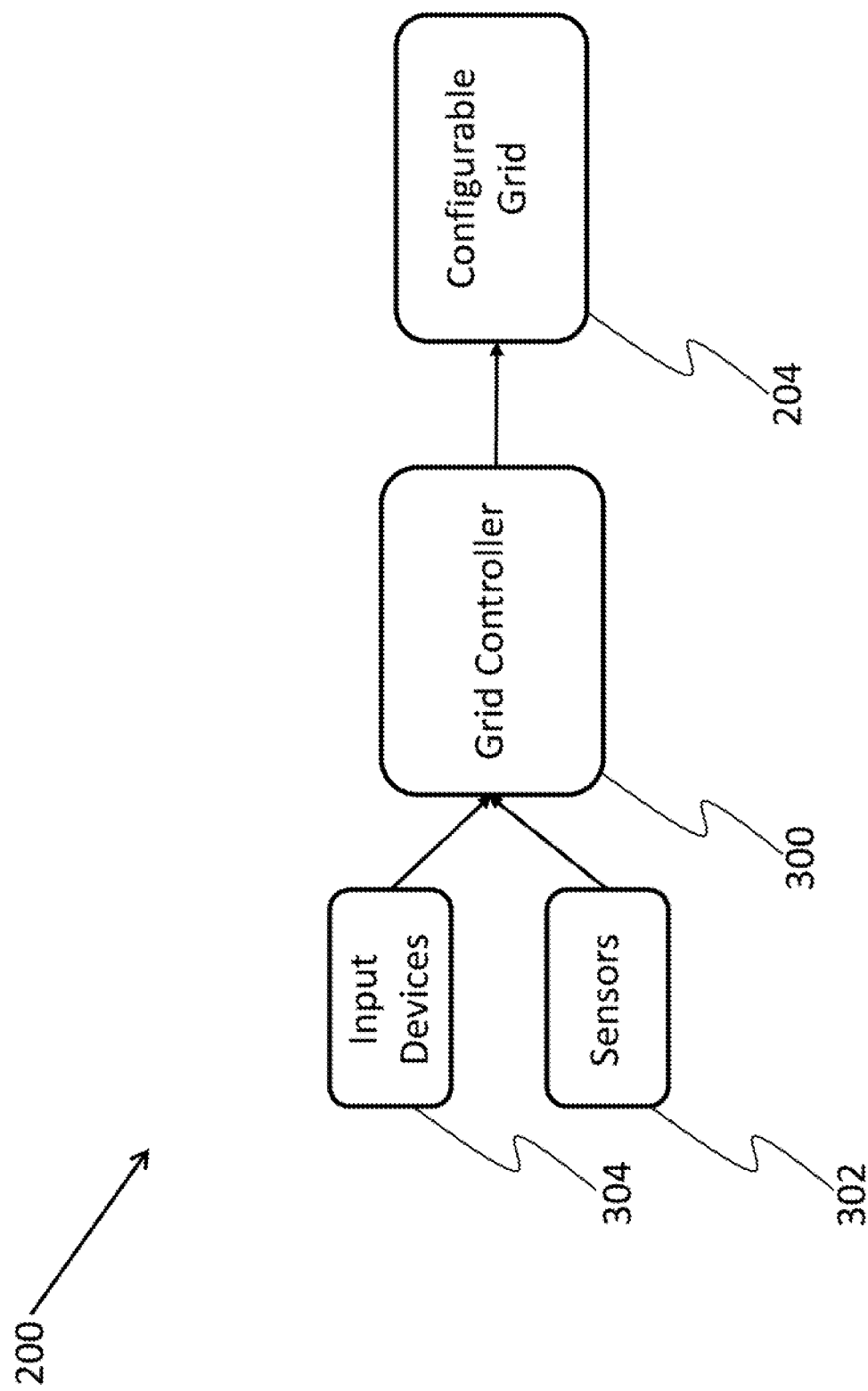
FIG. 3 is a diagram of a vision correction system according to the present invention.

FIG. 3 depicts additional components of the vision correction system 200. The configurable grid 204 is configured according to instructions it receives from the grid controller 300. The grid controller 300 takes inputs from either the sensors 302 or other input devices 304. The sensors 302 provide information which allows the grid controller 300 to determine how to configure the configurable grid 204. Non-limiting examples of such information includes, distance of the configurable grid 204 from the viewer's eyes, orientation of the configurable grid 204 relative to the viewer's eyes and the brightness of ambient light. The sensors 302 may be any type of sensor which provides information about the local environment. Non-limiting examples include, cameras, rangefinders, LIDAR, RADAR, gyroscopes, etc. In addition to or in lieu of sensors 302, the grid controller 300 may take input from various input devices 304 to assist in determining how to configure the configurable grid 204. Non-limiting examples include, allowing the viewer specify the precise nature of their vision acuity problem, allowing the viewer to select a specific magnification, or allowing the viewer to specify the viewing distance or angle. Any input device suitable for receiving input from the viewer is acceptable. Non-limiting examples include, mouse, keyboard, touchscreen, buttons, etc.

What is claimed is:

1. A system for correcting vision comprising:
an electronic panel display;
a configurable grid proximate to the electronic panel display comprised of magnetically sensitive nanoparticles suspended in an optically transparent medium and an array of micro-electromagnets;
a grid controller; and
a viewer where light emitted from the electronic panel display travels through the configurable grid to the viewer such that when the grid controller instructs the micro-electromagnets in the configurable grid to exert force on the magnetically sensitive nanoparticles, it alters the location and orientation of the magnetically sensitive nanoparticles within the optically transparent medium, which, in turn, modifies the path of the light as it passes through the configurable grid thereby altering the path of the light to the viewer.

2. A system as set forth in claim 1, wherein the grid controller receives input from one or more sensors.

3. A system as set forth in claim 2, wherein the grid controller instructs the configurable grid to change shape based on inputs received from the sensors.

4. A system as set forth in claim 1, wherein the system further comprises an input device.

5. A system as set forth in claim 4, wherein the grid controller instructs the configurable grid to change shape based on inputs from the input device.

6. A system as set forth in claim 3, wherein one of the sensors is a camera.

7. A system as set forth in claim 3, wherein one of the sensors is a rangefinder.

8. A system as set forth in claim 1, wherein the electronic panel display contains a backlight.

9. A system as set forth in claim 1, wherein the electronic panel display utilizes electrical current or an electrical charge to produce, create or emit light.

\* \* \* \* \*